US008006227B2

(12) United States Patent
Callahan et al.

(10) Patent No.: US 8,006,227 B2
(45) Date of Patent: Aug. 23, 2011

(54) EFFICIENTLY LOCATING TRANSACTIONAL CODE BLOCKS IN A TRANSACTIONAL MEMORY SYSTEM

(75) Inventors: David Callahan, Seattle, WA (US); Vinod K. Grover, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1117 days.

(21) Appl. No.: 11/809,514

(22) Filed: Jun. 1, 2007

(65) Prior Publication Data
US 2008/0301664 A1 Dec. 4, 2008

(51) Int. Cl.
*G06F 9/44* (2006.01)
(52) U.S. Cl. .................................................... 717/110
(58) Field of Classification Search .................. 717/100, 717/106–108, 131, 140, 149, 111
See application file for complete search history.

(56) References Cited

U.S. PATENT DOCUMENTS

| | | | |
|---|---|---|---|
| 5,157,777 A | 10/1992 | Lai et al. | |
| 5,999,987 A | 12/1999 | O'Farrell et al. | |
| 6,085,035 A | 7/2000 | Ungar | |
| 6,138,269 A | 10/2000 | Ball | |
| 6,553,384 B1 | 4/2003 | Frey et al. | |
| 6,654,760 B2 | 11/2003 | Baskins et al. | |
| 6,826,757 B2 | 11/2004 | Steele, Jr. et al. | |
| 7,058,954 B1 | 6/2006 | Wollrath et al. | |
| 7,076,784 B1 | 7/2006 | Russell et al. | |
| 7,395,382 B1* | 7/2008 | Moir ............................ | 711/147 |
| 2004/0015642 A1 | 1/2004 | Moir et al. | |
| 2005/0039172 A1* | 2/2005 | Rees et al. .................... | 717/130 |
| 2007/0055960 A1* | 3/2007 | Damron et al. ............... | 717/131 |
| 2007/0143287 A1 | 6/2007 | Adl-tabatabai et al. | |
| 2007/0156780 A1 | 7/2007 | Saha et al. | |
| 2007/0156994 A1 | 7/2007 | Akkary et al. | |
| 2008/0120590 A1* | 5/2008 | Wang et al. .................. | 717/100 |

FOREIGN PATENT DOCUMENTS

GB 2239334 A 6/1991

OTHER PUBLICATIONS

Tabatabai, et al., "Compiler and Runtime Support for Efficient Software Transactional Memory," Jun. 2006, PLDI'06, p. 26-37.*
International Search Report and Written Opinion Received for PCT Application No. PCT/US2008/065312, mailed on Dec. 30, 2008, 10 pages.
Herlihy, et al., "Software Transactional Memory for Dynamic-Sized Data Structures," Date: Jul. 13-16, 2003, pp. 1-10.
Herlihy, et al., "Transactional Memory:Architectural Support for Lock-Free Data Structures" pp. 1-12.
Shaughnessy, "Managed Code Database Advantage for the Microsoft .NET Framework Platform", http://bdn1.borland.com/borcon2004/article/paper/0,1963,32236,00.html.

* cited by examiner

*Primary Examiner* — Anna Deng

(57) ABSTRACT

Various technologies and techniques are disclosed for creating and/or locating transactional code blocks in a transactional memory system. A user such as a software developer can decorate a particular function with an identifier to indicate that the particular function is transaction-safe. A normal version and a transactional version are then created for each function of a software application that is marked as transaction-safe. A normal version is created for each function that is not marked as transaction-safe. For the normal version of each function that is marked as transaction-safe, a stub pointer in the normal version is pointed to the transactional version. The proper version of the function is then called depending on the execution context.

16 Claims, 6 Drawing Sheets

EFFICIENTLY LOCATING TRANSACTIONAL CODE BLOCKS IN A TRANSACTIONAL MEMORY SYSTEM

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. STM is used as an alternative to traditional locking mechanisms. Programmers put a declarative annotation (e.g. atomic) around a code block to indicate safety properties they require and the system automatically guarantees that this block executes atomically with respect to other protected code regions. The software transactional memory programming model prevents lock-based priority-inversion and deadlock problems.

Software transactional memory (STM) systems can take certain sequential programs and allow for portions of those programs to be executed concurrently (e.g. in parallel) using transactions. The source code for these sequential programs is typically written by programmers using one of various types of programming languages. The source code is typically enclosed in one or more functions that contain the logic that is later executed by a computer. The term "function" is used broadly herein as covering functions, methods, procedures, statement blocks, and/or other portions of logic that are executed by a computer. With software transactional memory systems, every function that can be called from a transactional context must have two versions, one that can be called from transactions and one that can be called from non-transactions. Determining which version of the function to call is context dependent. This determination must be done at runtime for calls to virtual functions or through function pointers.

SUMMARY

Various technologies and techniques are disclosed for creating and/or locating transactional code blocks in a transactional memory system. A user such as a software developer can decorate a particular function with an identifier to indicate that the particular function is transaction-safe. A normal version and a transactional version are then created for each function of a software application that is marked as transaction-safe. A normal version is created for each function that is not marked as transaction-safe. For the normal version of each function that is marked as transaction-safe, a stub pointer in the normal version is pointed to the transactional version. The proper version of the function is then called depending on the application context.

In one implementation, a compiler generates the transactional and non-transactional version of the functions for use with the transactional memory system. At compile time, a stub pointer is allocated for each function in a software application. For each respective function that is not marked as a transaction-safe function, a normal version of the respective function is generated, and the stub pointer is filled in with an entry point of a runtime error routine. For each respective function that is marked as a transaction-safe function, code is created for a normal version and a transactional version of the respective function that is transaction-safe. Then, in the stub pointer for the normal version, an entry point is filled to the transactional version. In a stub pointer for the transactional version, an entry point is filled to the runtime error routine.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
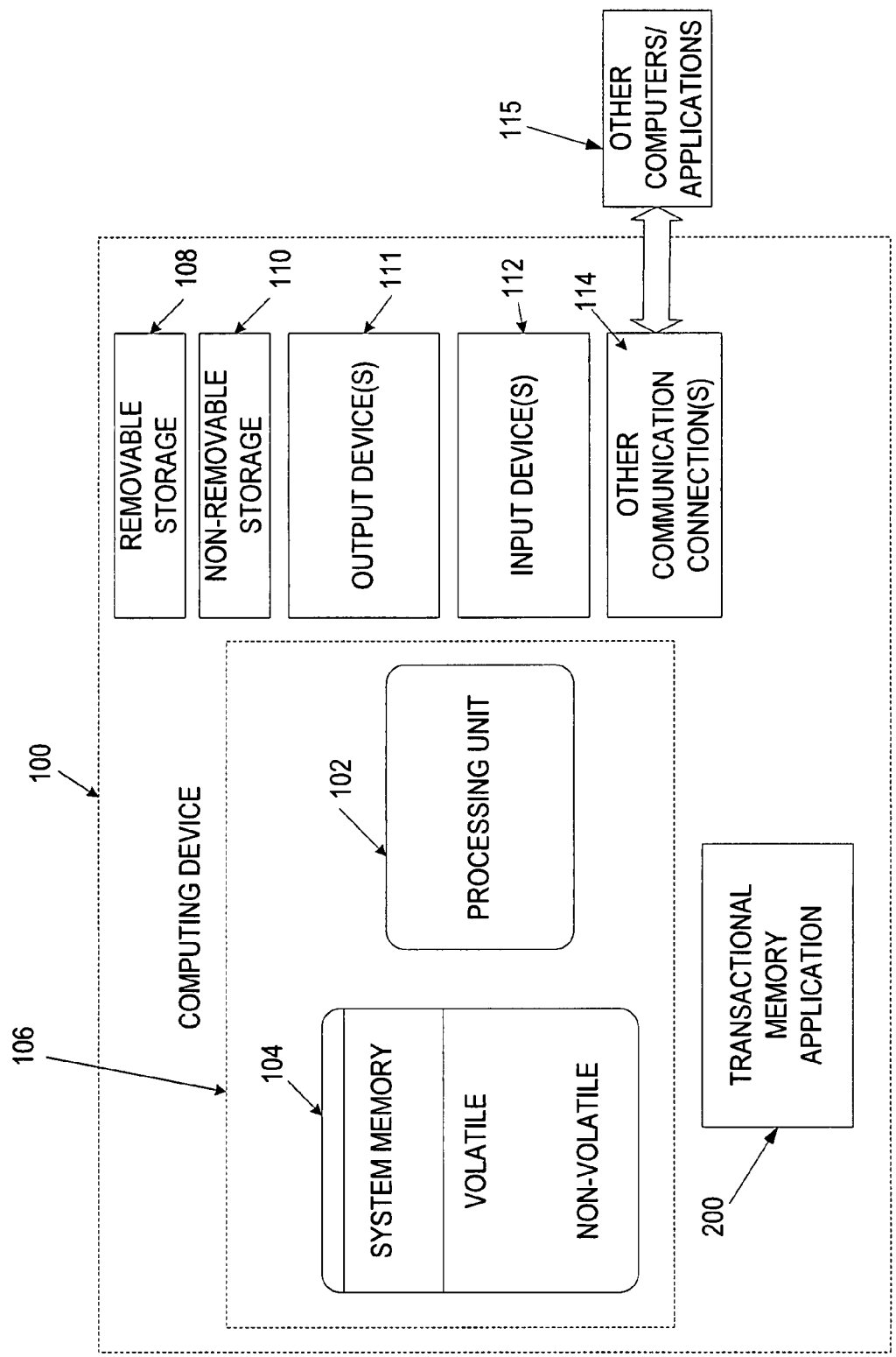
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

In one implementation, a transactional memory system is provided that programmatically creates two versions of each function that is marked as transaction-safe: a normal version of the function and a transactional version of the function. For functions that are not marked as transaction safe, only a normal version is created and a stub pointer at the entry point of the normal version is pointed to an error routine. Then, for functions that are marked as transaction-safe, a stub pointer of the entry point of the normal version is pointed to the transactional version of the function. A stub pointer at the entry point of the transactional version is pointed to an error routine. For functions that are not marked as transaction-safe, the stub pointer at the entry point of the normal version points to the error routine. The proper version of the function is then called depending on the execution context.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory application 200. Transactional memory application 200 will be described in further detail in FIG. 2.

Figure 2:
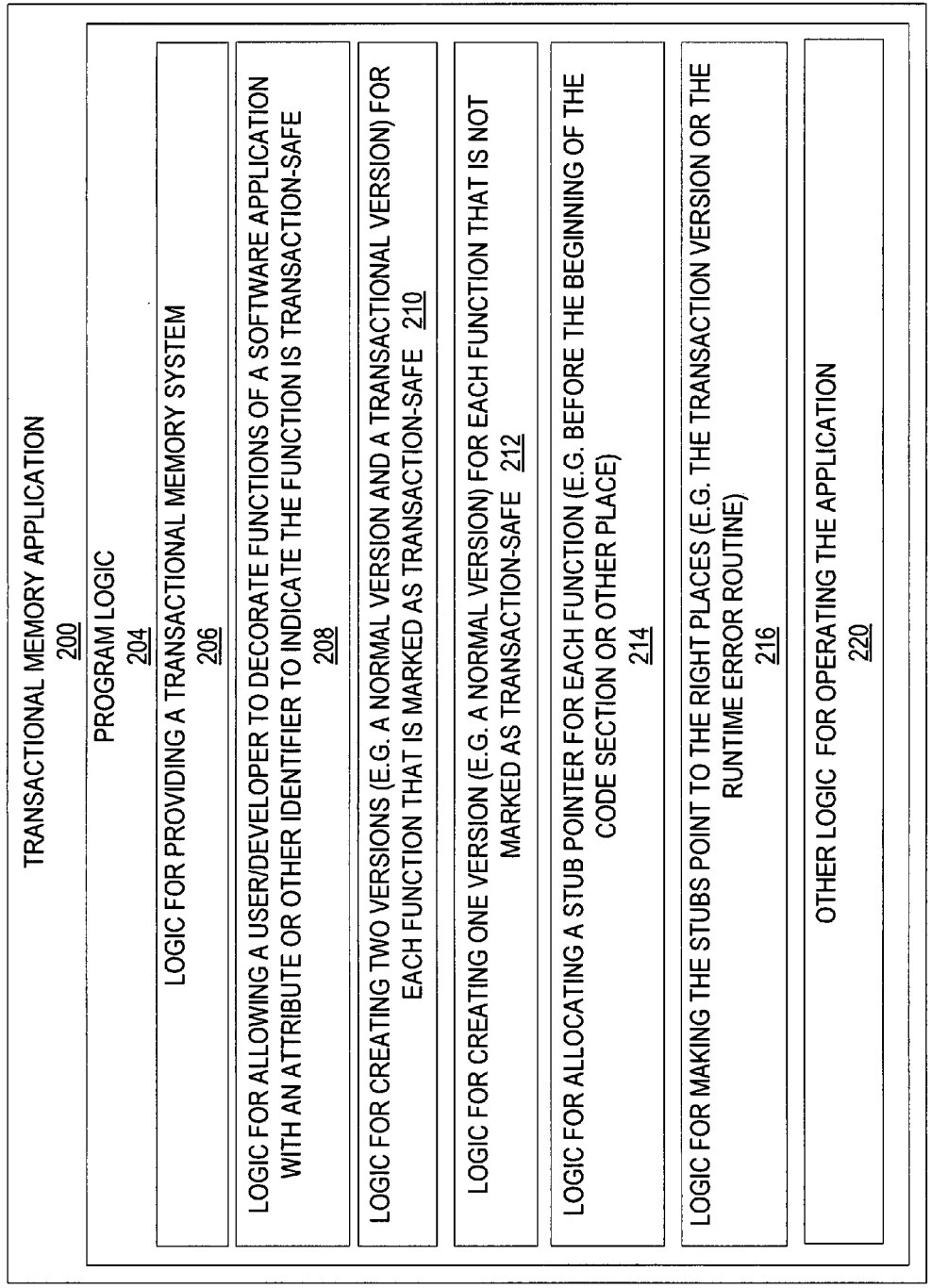
FIG. 2 is a diagrammatic view of a transactional memory application of one implementation operating on the computer system of FIG. 1.

Turning now to FIG. 2 with continued reference to FIG. 1, transactional memory application 200 operating on computing device 100 is illustrated. Transactional memory application 200 is one of the application programs that reside on computing device 100. However, it will be understood that transactional memory application 200 can alternatively or additionally be embodied as computer-executable instructions on one or more computers and/or in different variations than shown on FIG. 1. Alternatively or additionally, one or more parts of transactional memory application 200 can be part of system memory 104, on other computers and/or applications 115, or other such variations as would occur to one in the computer software art.

Transactional memory application 200 includes program logic 204, which is responsible for carrying out some or all of the techniques described herein. Program logic 204 includes logic for providing a transactional memory system 206; logic for allowing a user/developer to decorate functions of a software application with an attribute or other identifier to indicate the function is transaction-safe 208; logic for creating two versions (e.g. a normal version and a transactional version) for each function that is marked as transaction-safe 210; logic for creating one version (e.g. a normal version) for each function that is not marked as transaction-safe 212; logic for allocating a stub pointer for each function (e.g. before the beginning of the code section or other place) 214; logic for making the stubs point to the right places (e.g. the transactional version or the runtime error routine) 216; and other logic for operating the application 220. In one implementation, program logic 204 is operable to be called programmatically from another program, such as using a single call to a procedure in program logic 204.

Figure 3:
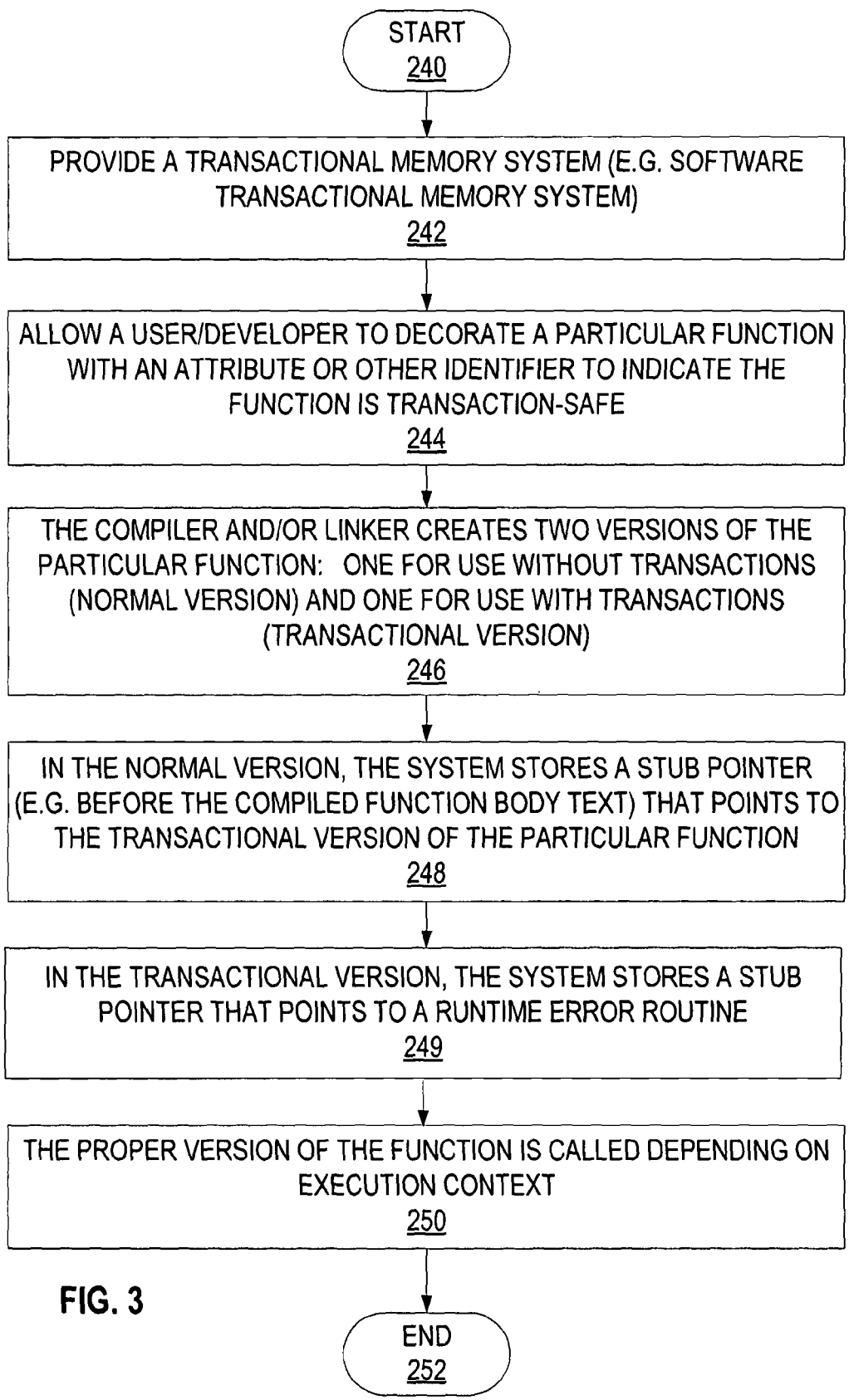
FIG. 3 is a high-level process flow diagram for one implementation of the system of FIG. 1.

Turning now to FIGS. 3-6 with continued reference to FIGS. 1-2, the stages for implementing one or more implementations of transactional memory application 200 are described in further detail. FIG. 3 is a high level process flow diagram for transactional memory application 200. In one form, the process of FIG. 3 is at least partially implemented in the operating logic of computing device 100. The process begins at start point 240 with providing a transactional memory system (e.g. a software transactional memory system) (stage 242). The system allows a user/developer to decorate a particular function with an attribute or other identifier to indicate the function is transaction-safe (stage 244). The compiler and/or linker create two versions of the particular function: one for use without transactions (e.g. the normal version) and one for use with transactions (e.g. the transactional version) (stage 246). In the normal version, the system stores a stub pointer points to the transactional version of the particular function (stage 248). In one implementation, the stub pointer(s) described herein are stored before the respective compiled function body text. In other implementations, the stub pointer can be stored in other locations, so long as it is associated with a respective version of the function. In the transactional version, the system stores a stub pointer that points to a runtime error routine (stage 249). The proper version of the function is called depending on execution context (stage 250). The process ends at end point 252.

Figure 4:
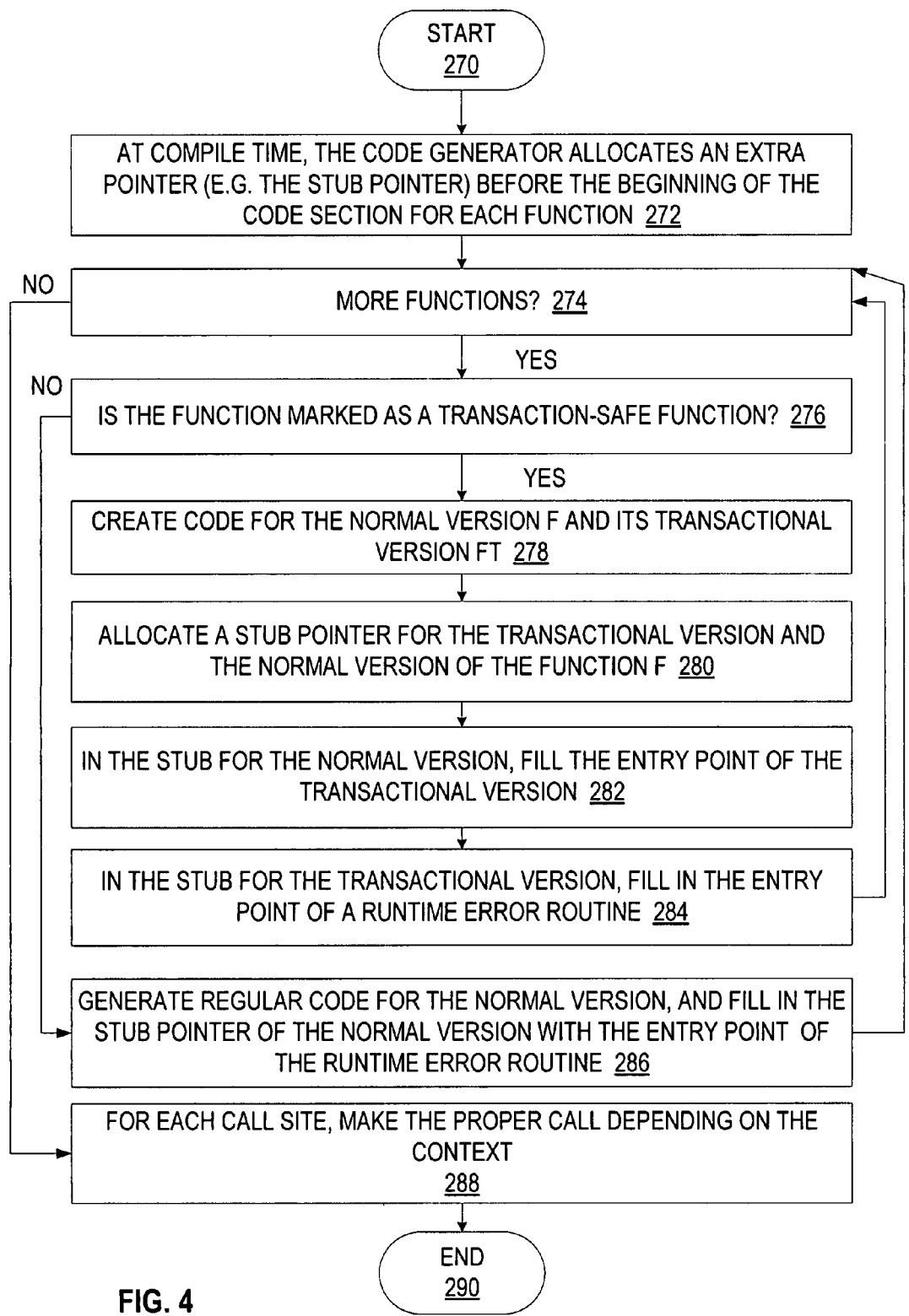
FIG. 4 is a process flow diagram for one implementation of the system of FIG. 1 illustrating the stages involved in using a code generator to generate code for transactional and non-transactional function and fill in the stub pointers as part of the compile and/or linking process.

FIG. 4 illustrates one implementation of the stages involved in using a code generator to generate code for transactional and non-transactional functions and to fill in the stub pointers as part of the compile/and or linking process. In one form, the process of FIG. 4 is at least partially implemented in the operating logic of computing device 100. The process begins at start point 270 with the code generator allocating an extra pointer (e.g. the stub pointer) for each function at compile time (stage 272). For each function (i.e. while there are more functions) (decision point 274), various tasks are performed. For example, if the function is not marked as being a transaction-safe function (decision point 276), then the system generates the normal version (i.e. regular code) for the function, and fills in the stub pointer of the normal version with the entry point of the runtime error routine (stage 286).

If the function is marked as a transaction-safe function (decision point 276), the system creates code for the normal version F and its transactional version FT (stage 278). The system then allocates a stub pointer for the transactional version and the normal version of the function F (stage 280). In the stub for the normal version, the entry point of the transactional version is filled (stage 282). In the stub for the transactional version, the entry point of a runtime error routine is filled (stage 284). These stages are repeated appropriately for each function. Then, for each call site, the system makes the proper call depending on the context (stage 288). The call site decision process is described in further detail in FIG. 5. The process ends at end point 290.

Figure 5:
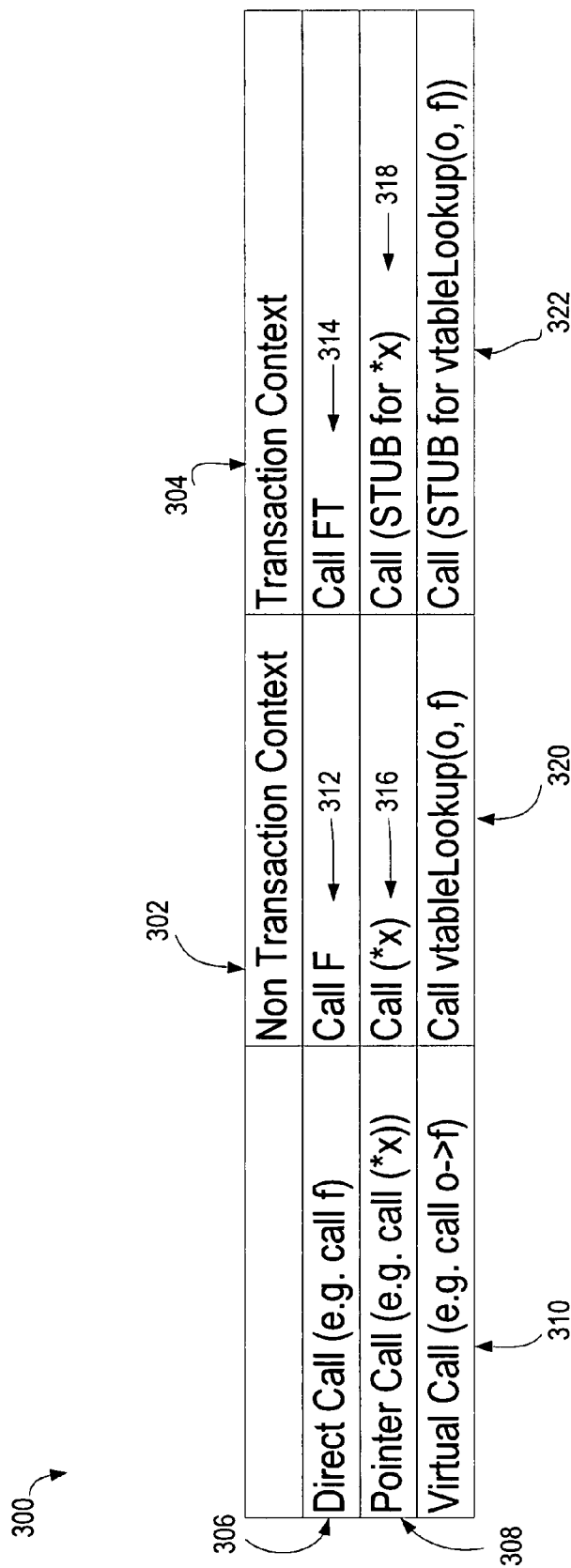
FIG. 5 is a diagram for one implementation of the system of FIG. 1 illustrating the decision tree for choosing the proper version of the function to call depending on execution context.

Turning now to FIG. 5, a diagram 300 for one implementation of the system of FIG. 1 illustrates a possible decision tree for choosing the proper version of the function to call depending on execution context. In one form, the decision process of FIG. 5 is at least partially implemented in the operating logic of computing device 100. For a direct call 306 in a non-transactional context 302, the entry point of the normal version is called directly for the function 312. For a direct call 306 in a transactional context 304, the entry point of the transactional version is called for the function 314. For a pointer call 308 in a non-transactional context 302, the call is the same as before 316. For a pointer call 308 in a transactional context 304, the address of the word pointing to the stub function is computed from the dereference of the function pointer value and then that address is used in the call 318. The stub is populated with a pointer to entry point of the transactional version and therefore the correct version is executed. A virtual or interface call 310 in a non-transactional context 302 is not affected, and is the same as before 320. A virtual or interface call 310 in the transactional context 304 performs the vtable lookup and then computes the stub function entry point of the transactional version of the function 322. The computed entry point is then used to make the call.

Figure 6:
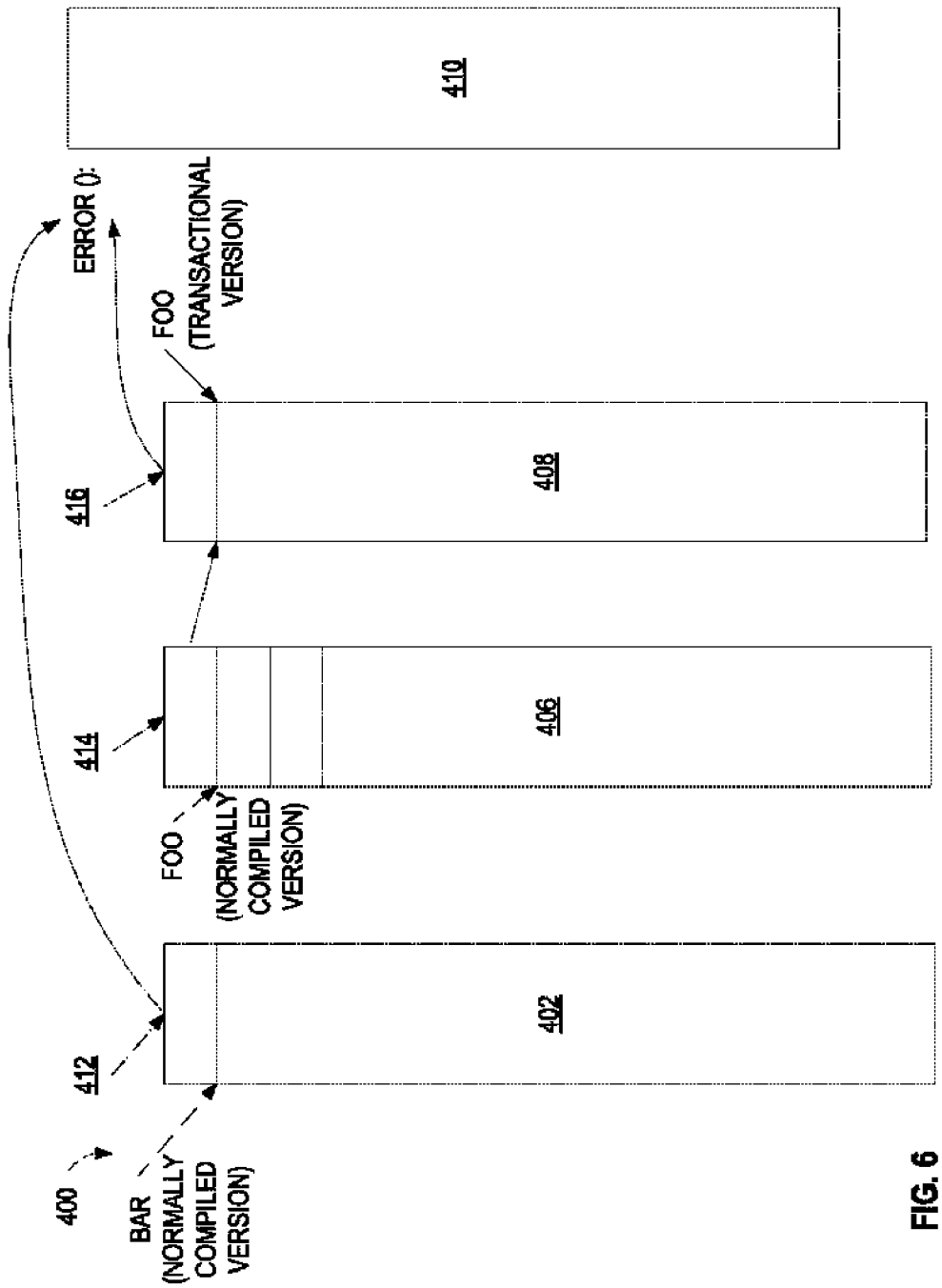
FIG. 6 is a logical diagram for one implementation that illustrates two hypothetical functions, one with just a normal version and the other with a normal version and a transactional version.

FIG. 6 is a logical diagram 400 for one implementation that illustrates two hypothetical functions, one with just a normal version and the other with a normal version and a transactional version. The "BAR" function 402 is a function that was not marked as transaction-safe in the source code. Thus, the entry pointer 412 to the function 402 points to the error routine 410. The "FOO" function 414 was marked as transaction-safe in the original source code, so a normally compiled version (the normal version) is provided 406, along with the transactional version 408. The entry point 414 of the normal version of FOO 406 points to the transactional version of FOO 408. The entry point 416 of the transactional version of FOO 408 points to the error routine 410. In one implementation, this error routine is embedded in the stubs (entry points) of these functions to allow errors to be caught at runtime when inappropriate use is encountered.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer storage medium having computer-executable instructions for causing a computer to perform steps comprising:
provide a transactional memory system;
create a normal version and a transactional version of each function of a software application that is marked as transaction-safe;
create a normal version of each function that is not marked as transaction-safe; and
for the normal version of each function that is marked as transaction-safe, point a stub pointer of the normal version to the transactional version, wherein the transactional version of each function that is marked as transaction-safe has a stub pointer that points to an error routine to allow an error to be caught at runtime when inappropriate use is encountered.

2. The computer storage medium of claim 1, wherein the stub pointer is allocated before a beginning of a code section of the normal version of each function.

3. The computer storage medium of claim 1, wherein for each function that is not marked as transaction-safe, point the stub pointer of the normal version to an error routine.

4. The computer storage medium of claim 1, wherein the normal version of each function that is not marked as transaction-safe has a stub pointer that points to an error routine.

5. A method for locating transactional code blocks in a transactional memory system comprising the steps of:
providing a transactional memory system;
allowing a user to decorate a particular function with an identifier to indicate that the particular function is transaction-safe;
creating two versions of the particular function, a normal function for use without transactions and a transactional function for use with transactions, wherein the transactional version of each function that is marked has transaction-safe has a stub pointer that points to an error routine to allow an error to be caught at runtime when inappropriate use is encountered;
storing a stub pointer in the normal function that points to the transactional function; and
calling a proper version of the particular function depending on execution context, wherein if the execution context is a transactional context with a virtual call to the particular function, then a vtable lookup is performed and an entry point computed for the stub pointer of the transactional function, and then the computed entry point is used to make the virtual call.

6. The method of claim 5, wherein if the execution context is a non-transactional context with a direct call to the particular function, then the normal function is called.

7. The method of claim 5, wherein if the execution context is a transactional context with a direct call to the particular function, then the transactional function is called.

8. The method of claim 5, wherein if the execution context is a non-transactional context with a pointer call to the particular function, then the pointer call operates as normal.

9. The method of claim 5, wherein if the execution context is a transactional context with a pointer call to the particular function, then a stub size is subtracted from a de-reference of a function pointer value to calculate a resulting value, and then the resulting value is called.

10. The method of claim 5, wherein if the execution context is a non-transactional context with a virtual call to the particular function, then the virtual call operates as normal.

11. The method of claim 5, wherein the identifier is an attribute.

12. The method of claim 5, wherein a compiler creates the two versions of the particular function.

13. The method of claim 5, wherein the stub pointer that points to the transactional function is stored at the beginning of the normal function.

14. A computer storage medium having computer-executable instructions for causing a computer to perform the steps recited in claim 5.

15. A method for creating transactional and non-transactional versions of functions for use in a transactional memory system comprising the steps of:
at compile time, allocating a stub pointer for each function of a plurality of functions in a software application;
for each respective function of the plurality of functions that is not marked as a transaction-safe function, generating a normal version of the respective function that is not transaction-safe, and filling in the stub pointer with an entry point of a runtime error routine; and for each respective function of the plurality of functions that is marked as a transaction-safe function, perform a process comprising the steps of:

creating code for a normal version and a transactional version of the respective function that is transaction-safe;

in the stub pointer for the normal version, filling an entry point of the transactional version;

in a stub pointer for the transactional version, filling an entry point of a runtime error routine to allow an error to be caught at runtime when inappropriate use is encountered; and for each call site in each function in the software application, make proper function calls depending on a context.

16. A computer storage medium having computer-executable instructions for causing a computer to perform the steps recited in claim 15.

* * * * *